US008867486B2

(12) United States Patent
Cherian et al.

(10) Patent No.: US 8,867,486 B2
(45) Date of Patent: Oct. 21, 2014

(54) WIRELESS DATA COMMUNICATIONS EMPLOYING IP FLOW MOBILITY

(75) Inventors: George Cherian, San Diego, CA (US); Jun Wang, La Jolla, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 12/758,259

(22) Filed: Apr. 12, 2010

(65) Prior Publication Data

US 2011/0090794 A1 Apr. 21, 2011

Related U.S. Application Data

(60) Provisional application No. 61/170,432, filed on Apr. 17, 2009.

(51) Int. Cl.
*H04W 36/24* (2009.01)
*H04L 12/721* (2013.01)
*H04W 36/00* (2009.01)
*H04W 40/36* (2009.01)
*H04W 36/14* (2009.01)
*H04W 60/00* (2009.01)
*H04W 80/04* (2009.01)

(52) U.S. Cl.
CPC .......... *H04W 36/0027* (2013.01); *H04W 40/36* (2013.01); *H04L 45/38* (2013.01); *H04W 36/14* (2013.01); *H04W 60/005* (2013.01); *H04W 80/04* (2013.01)
USPC .......................................... 370/331; 455/442

(58) Field of Classification Search
CPC ... H04W 40/36; H04W 60/005; H04W 76/04; H04W 76/041; H04L 45/38; H04L 47/2441; H04L 47/2483; H04L 47/80–47/808
USPC ........... 370/328–334, 338, 468; 455/436–444
See application file for complete search history.

(56) References Cited

U.S. PATENT DOCUMENTS

2005/0144321 A1* 6/2005 Forsberg ........................ 709/245
2006/0129630 A1* 6/2006 Catalina-Gallego et al. . 709/203

FOREIGN PATENT DOCUMENTS

CN 1622524 A 6/2005
EP 1432198 6/2004
(Continued)

OTHER PUBLICATIONS

3GPP TR 23.861 V1.0.0, 3rd Generation Partnership Project; Technical Specification Group Services and System Aspects; Multi access PDN connectivity and IP flow mobility (Release 9), Mar. 2009, pp. 1-34.*

(Continued)

*Primary Examiner* — Pao Sinkantarakorn
(74) *Attorney, Agent, or Firm* — Darren M. Simon

(57) ABSTRACT

Techniques for IP flow mobility in a wireless data communications system, which allow for selective movement of IP data flows between different access networks supporting different access technology types. An access terminal (AT) is configured to selectively communicate using plural access technologies. Plural IP data flows are established between the AT and a first access network using a first technology type. A flow mobility trigger condition is detected, and in response, at least one IP data flow is moved to a second access network using a second technology, while maintaining at least another of the data flows to the first access network, and using the same IP address for the AT for data flows handled by both access networks, by using a mapping function between packet-filters for data flows and the access technology. The techniques may be used in conjunction with IP mobility protocols such as PMIP and CMIP.

28 Claims, 10 Drawing Sheets

(56) References Cited

FOREIGN PATENT DOCUMENTS

| JP | 2008312171 A | 12/2008 |
| JP | 2009005342 A | 1/2009 |
| JP | 2010512702 A | 4/2010 |
| JP | 2010537528 A | 12/2010 |
| WO | 2007138407 A2 | 12/2007 |
| WO | 2008071276 A1 | 6/2008 |
| WO | 2009024466 A1 | 2/2009 |

OTHER PUBLICATIONS

Hesham Soliman, et al., "Flow movement in Mobile IPv6; draftsoliman- mobileip-flow-move-03.txt" IETF Standard-Workingdraft, Internet Engineering Task Force, IETF, CH, No. 3, Jun. 1, 2003, XP015035548 ISSN: 0000-0004.

International Search Report and Written Opinion—PCT/US2010/031474, International Search Authority—European Patent Office—Aug. 23, 2010.

Telcordia et al: "Routing Filters for MAPIM" 3GPP Draft; S2-091697-S2-091461_S2-091117_S2_71_TD_MAPIM_ROUTINGFILTERS, 3rd Generation Partnership Project (3GPP), Mobile Competence Centre ; 650, Route Des Lucioles ; F-06921 Sophia-Antipolis Cedex ; France, Feb. 2009.

* cited by examiner

WIRELESS DATA COMMUNICATIONS EMPLOYING IP FLOW MOBILITY

RELATED APPLICATIONS

Claim of Priority Under 35 U.S.C. §119

The present application for patent claims priority to Provisional U.S. Application No. 61/170,432 entitled "A General Framework for IP Flow Mobility" filed Apr. 17, 2009 and assigned to the assignee hereof and hereby expressly incorporated by reference herein.

TECHNICAL FIELD

The present disclosure relates generally to wireless data communications and more particularly, to techniques for improving wireless mobile Internet Protocol (IP) data communications.

BACKGROUND

New designs for third and fourth generation (3G and 4G) capable wireless devices and networks enable users to transmit/receive simultaneous IP data streams to/from multiple destinations or web sites and thereby multitask among different applications. For instance, a user might choose to hold a VoIP phone conversation while simultaneously surfing web pages with a browser application and receiving streaming video using a third application. All of these tasks may be performed on a single channel of an air interface access technology in protocols such as LTE (Long Term Evolution), HRPD (High Rate Packet Data), WiFi, WiMax, etc.

Simultaneous operation of the tasks may be achieved via packet data transmission and multiplexing which essentially implements a time division sharing of the channel among the applications. In an alternative approach, multiple tasks may be split up among two or more of the access technologies for simultaneous access by establishing a different mobility session for each technology.

The two most commonly used mobile IP protocols currently in use are known as Client Mobile IP (CMIP) and Proxy Mobile IP (PMIP). Both of these protocols are grounded on the concepts of home networks, home addressing, and IP tunnels. The protocols allow for location-independent routing of IP packets on the Internet. The earlier protocol, CMIP (also called MIP), has been revised several times; a recent version is set forth in an Internet Engineering Task Force (IETF) document RFC 3775 entitled "Mobility Support in IPv6", by Johnson et al., June 2004. PMIP is described in IETF document RFC 5213 entitled "Proxy Mobile IPv6", by Gundavelli et al., August 2008.

In the operation of CMIP and PMIP, a large wireless network is subdivided into zones, where each zone may be designated as a home network for a number of access terminals (cell phones with Internet capability, laptops, PDA's, etc.). Thus, each access terminal that is permitted to access the large network is assigned to a home network, which is typically the zone in which the subscriber of the access terminal resides. The access terminal is also called a host or a mobile node. The access terminal communicates via the network with correspondent nodes (CNs) attached to the Internet; these CNs may be web sites, other access terminals, fixed location computers, etc.

The home network of a mobile node is the network within which the mobile node receives its identifying IP address. A mobile node is always expected to be addressable at its home address, whether it is currently attached to its home link or is away from home. The home network includes an entity responsible for maintaining this home address. In CMIP this entity is called a home agent; in PMIP it is called a local mobility anchor (LMA). A home agent or LMA is a router which tunnels packets for delivery to the mobile node when it is away from home. The packets are tunneled to an access gateway of an access network in another zone at a "care-of address" for the mobile node. In CMIP this access gateway is called a foreign agent or an access router (in earlier and later versions, respectively); in PMIP it is called a mobility access gateway (MAG).

Despite the recent technological advances that have made mobile IP operation not only possible but ubiquitous, the goal of enhancing the user experience is never ending. To this end, efforts continue to improve quality by reducing the occurrence of dropped calls, interruptions, delays, interference, etc., as well as to optimize system resources, add functionality and expand services.

SUMMARY

Disclosed herein are techniques for IP flow mobility in a wireless communications system, which allow for selective movement of IP data flows to/from an access terminal between different access networks supporting different access technology types.

In a wireless communications system, an access terminal is configured to selectively communicate using a plurality of access technology types. A plurality of IP data flows are established between the access terminal and a first access network using a first technology type. A flow mobility trigger condition is detected, and in response, at least one IP data flow is moved to a second access network using a second technology type, while maintaining at least another one of the data flows to the first access network using the first access technology type. The same IP address is used for the thus moved data flow, whereby the flow mobility can be transparent to applications running on both a correspondent node in communication with the access terminal, and on an application within the access terminal itself.

The flow mobility may be facilitated by means of a mobility anchor, such as a home agent or an LMA, which stores a home IP address of the access terminal and routes flows to the access terminal via IP tunneling to the first and second access networks. A flow map such as a traffic flow template (TFT) may be set up at both the mobility anchor and the access terminal to map data flows with respect to the access terminal to the first or second access networks. Signaling to set up the flow map may be initiated either by the access terminal, the mobility anchor, or another network equipment.

At least the downlink flows can be IP tunneled from the mobility anchor to the first or second access networks in accordance with a matching of packet header data thereof to flow map entries for one or more of: a destination port of the access terminal, a source address of a correspondent node attempting communication with the access terminal, a source port of the correspondent node, and a protocol used for communication between the access terminal and the correspondent node.

The flow mobility techniques disclosed herein may be used in conjunction with networks operating according to existing mobility protocols such as PMIP or CMIP.

DETAILED DESCRIPTION

The detailed description set forth below in connection with the appended drawings is intended as a description of exemplary aspects of the present invention and is not intended to represent the only aspects in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments or aspects of the invention may be practiced without these specific details. In some instances, well-known structures and devices are shown in block diagram form in order to avoid obscuring the novelty of the exemplary embodiments presented herein.

Figure 1A:
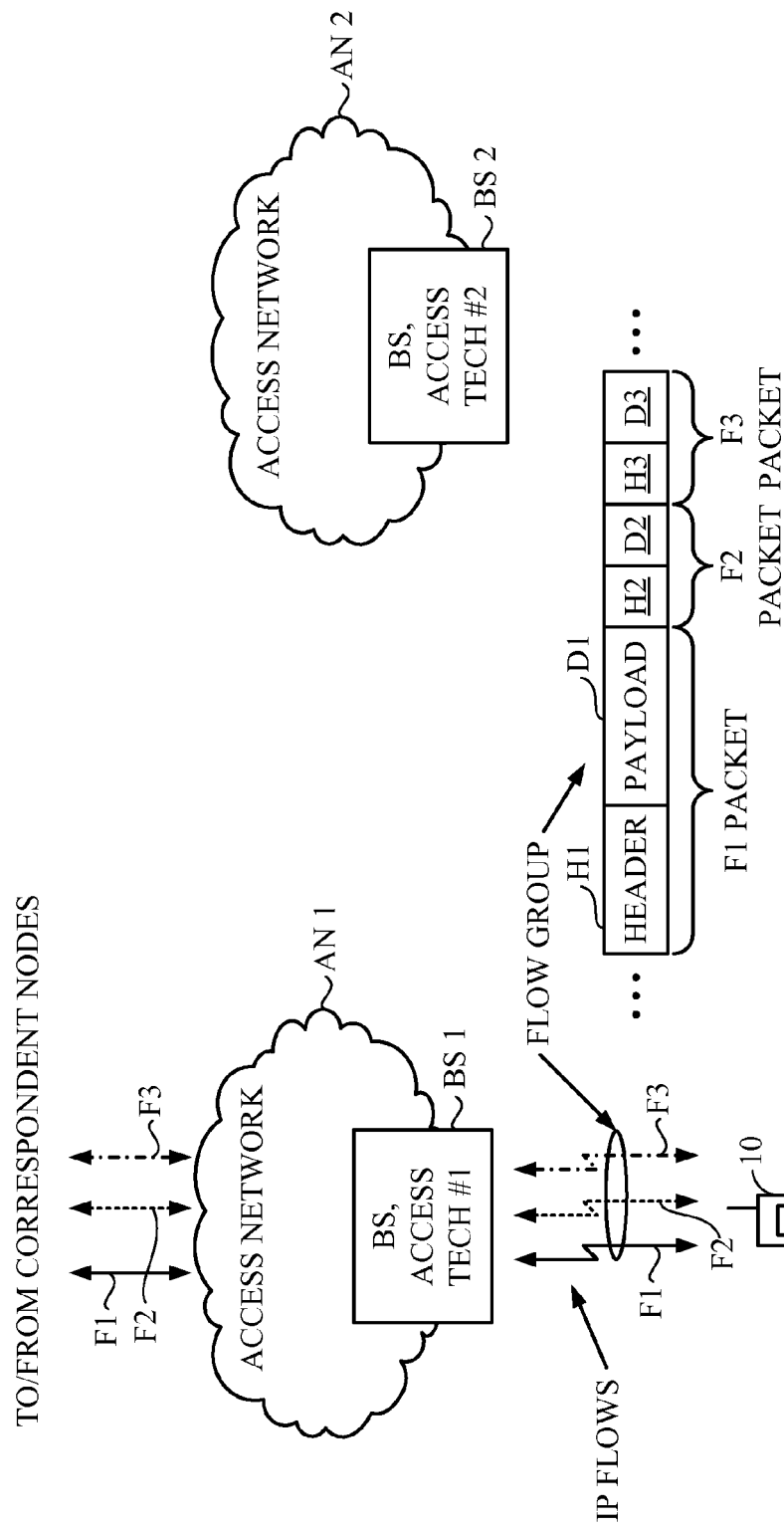
FIG. 1A illustrates an example of a wireless data communication system arrangement supporting simultaneous IP flows between an access terminal and a network.

FIG. 1A illustrates an example of a wireless data communications system arrangement supporting simultaneous IP data flows between an access terminal and a network. The example of FIG. 1A depicts a communication state that may be accomplished in the related art, as well as in accordance with aspects taught herein. An access terminal (AT) 10 is shown in data communication with a base station (BS) BS1 that is part of a first access network AN1. Base station BS1 provides a dedicated communications channel for AT 10 using a single air interface access technology capable of supporting IP packet propagation. Examples of such access technologies include but are not limited to technologies based on CDMA (e.g., CDMA2000, HRPD (High Rate Packet Data), eHRPD (evolved HRPD), WCDMA (Wideband CDMA)); or access technologies conforming to specifications or promulgated standards such as Long Term Evolution (LTE); GSM (Global System for Mobile Communications), WiFi and WiMax.

AT 10 may be a cellular phone, a laptop computer, a personal digital assistant, a netbook, or any device such as a camera or electronic book having wireless IP capability. In general, AT 10 may also be called a wireless device, a mobile node (MN), a user equipment (UE), a mobile equipment (ME), a mobile terminal (MT), a subscriber station, etc. A base station as BS1 may alternatively be called an access point (AP), a base transceiver station (BTS), a node B, and so forth.

As used herein, the term "flow" or "data flow" or "IP data flow" (used as a noun) refers to a bit stream that is propagated between two data communication entities, e.g., between a software application running on an access terminal and a software application running on a correspondent node. Since an access terminal and a correspondent node can each have multiple applications running simultaneously, it is possible for multiple data flows to propagate between an access terminal and a correspondent node simultaneously, via different communication ports thereof. A data flow may be bidirectional, as in a client-server type communication, or may be unidirectional, as in a broadcast. Nevertheless, herein, bit streams propagated in opposite directions of a bidirectional data flow may still be referred to a singular "flow" (e.g., an uplink flow or a downlink flow of a bidirectional data flow). An IP data flow can be identified by the source IP address, destination IP address, source port number of the application, destination port number of the application, and the protocol ID. The data flow concept will be explained further in the examples below.

Base station BS1 and access network AN1 serve to support data communication sessions between access terminals as AT 10 and correspondent nodes attached to a packet data network, typically the Internet. AT 10 is equipped with communication electronics, processing capability and application software sufficient to support multiple IP data communication streams, i.e., multiple IP flows. Each IP flow is typically for an individual data communication session between AT 10 and a different correspondent node (however, as just mentioned, it is conceivable to have multiple data flows between an AT and a correspondent node via different ports of each entity). In the example shown, three IP flows F1, F2 and F3 are established between the AT 10 and respective correspondent nodes (not shown). By way of example to help explain the concepts taught herein, flow F1 may represent the data from a VoIP application; flow F2 may represent a browser application flow; and flow F3 may represent data flow of a video teleconference application. Since, as just exemplified, the various flows may contain data for different types of applications having different requirements, the flows may be communicated at different overall data transmission rates.

A second base station BS2 is located either in the vicinity of AT 10, or, is out of range of AT 10. Base station BS2 is part of a second access network AN2 and communicates with access terminals using a second access technology different from that used by base station BS1. AT 10 is configured to communicate with base stations using the second access technology as well as the first; however, flows F1-F3 have already been established with base station BS1 in the example.

FIG. 1A also depicts an example of data flows F1-F3 organized as IP packets and time division multiplexed to form a single data stream. The packetized data stream comprised of multiple IP flows is called a flow group. This technique is one approach for realizing essentially simultaneous propagation of the multiple flows F1-F3 using just one channel of an air interface technology. A packet within flow F1 has a header H1 followed by a data payload D1. Transmission of an F1 packet may be followed in sequence by F2 and F3 packets as shown, with respective headers and payloads H2, D2 and H3, D3. For instance, if flow F1 is to be transmitted at a higher data rate than flows F2 and F3, this may be accomplished by using longer payloads for F1 and/or transmitting more F1 packets than F2 and F3 packets in a given time period.

Figure 1B:
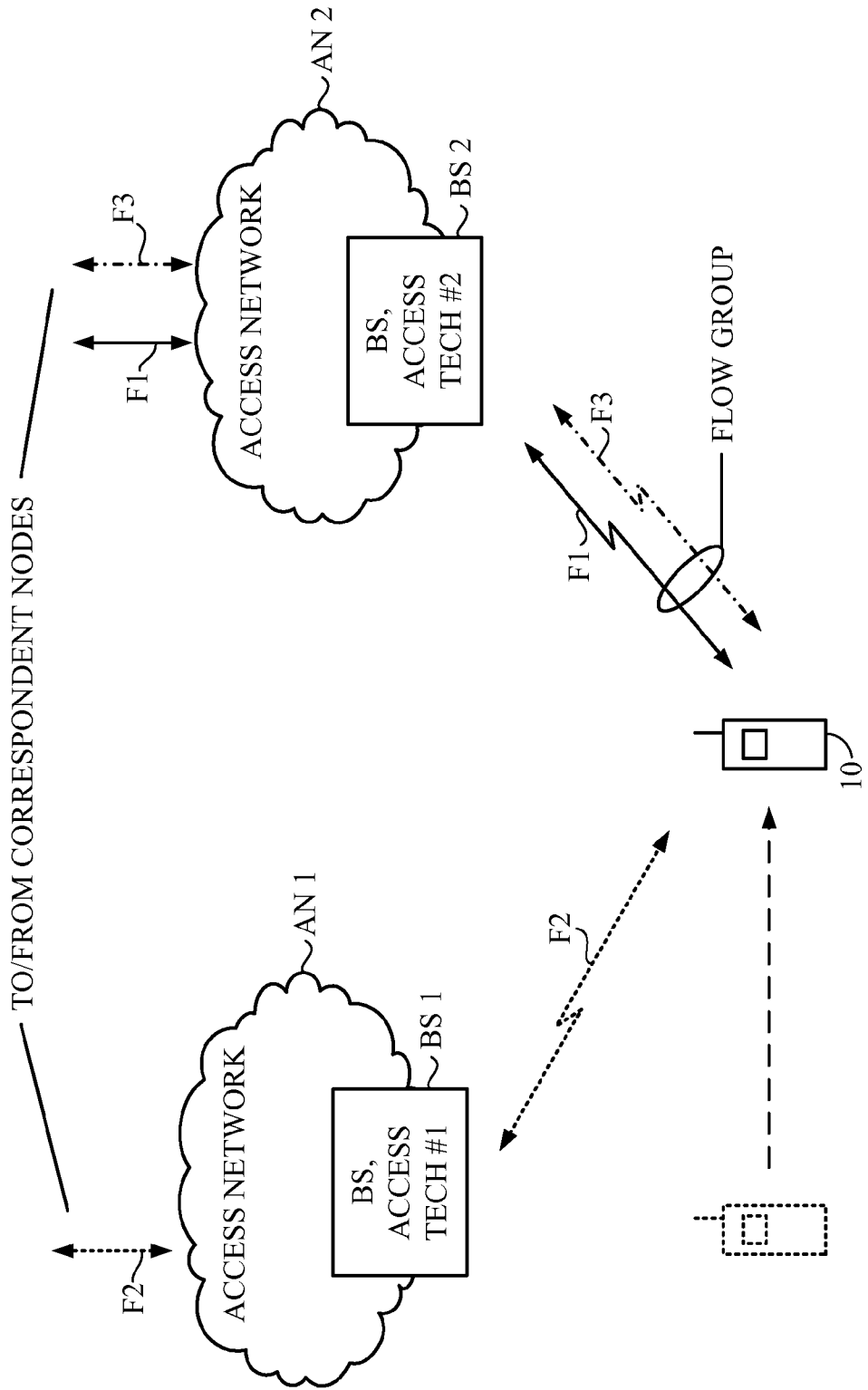
FIG. 1B illustrates the concept of IP flow mobility in accordance with an aspect of the disclosure.

FIG. 1B illustrates the concept of IP flow mobility in accordance with an aspect of the disclosure. With IP flow mobility, one or more individual flows between a first access network and an access terminal are selectively moved (handed off) to a second access network employing a different access technology. These handoffs are performed while maintaining the same IP address for the access terminal for each of the flows that are moved. In the example scenario shown, AT 10 has moved into the vicinity of base station BS2 and a decision has been made to transfer two of the flows, F1 and F3, to the second access network AN2 via base station BS2. Flow F2 remains handled by access network AN1. In the downlink direction, the same IP address is maintained for AT 10. That is, in the downlink direction, the mobility anchor (discussed below) uses the same IP address of the access terminal to transmit the packets of flow F2 using access network AN1 as well as for the packets of flow F1 and flow F2 using access network AN2. Maintaining the same IP address for the flow that has been moved allows the flow movement to be transparent to the correspondent node on the other side of the flow, as well as for the application(s) in the access terminal that was using this flow. Thus, the applications running in the correspondent node and the access terminal need not be interrupted in order to change the AT's IP address in subsequent packets.

The decision to move an individual flow to the second access network may be made based on a number of triggers. For instance, one of the flows may require a high data rate for which the second access technology is better suited to handle. Or, the first access network, but not the second, may be operating at or close to full capacity. Here, a handoff of some flows to the second access network will serve to balance out and better manage overall system resources. Other example triggers will be described further below. The decision to move a flow may be made either by the access terminal or the network.

Figure 2A:
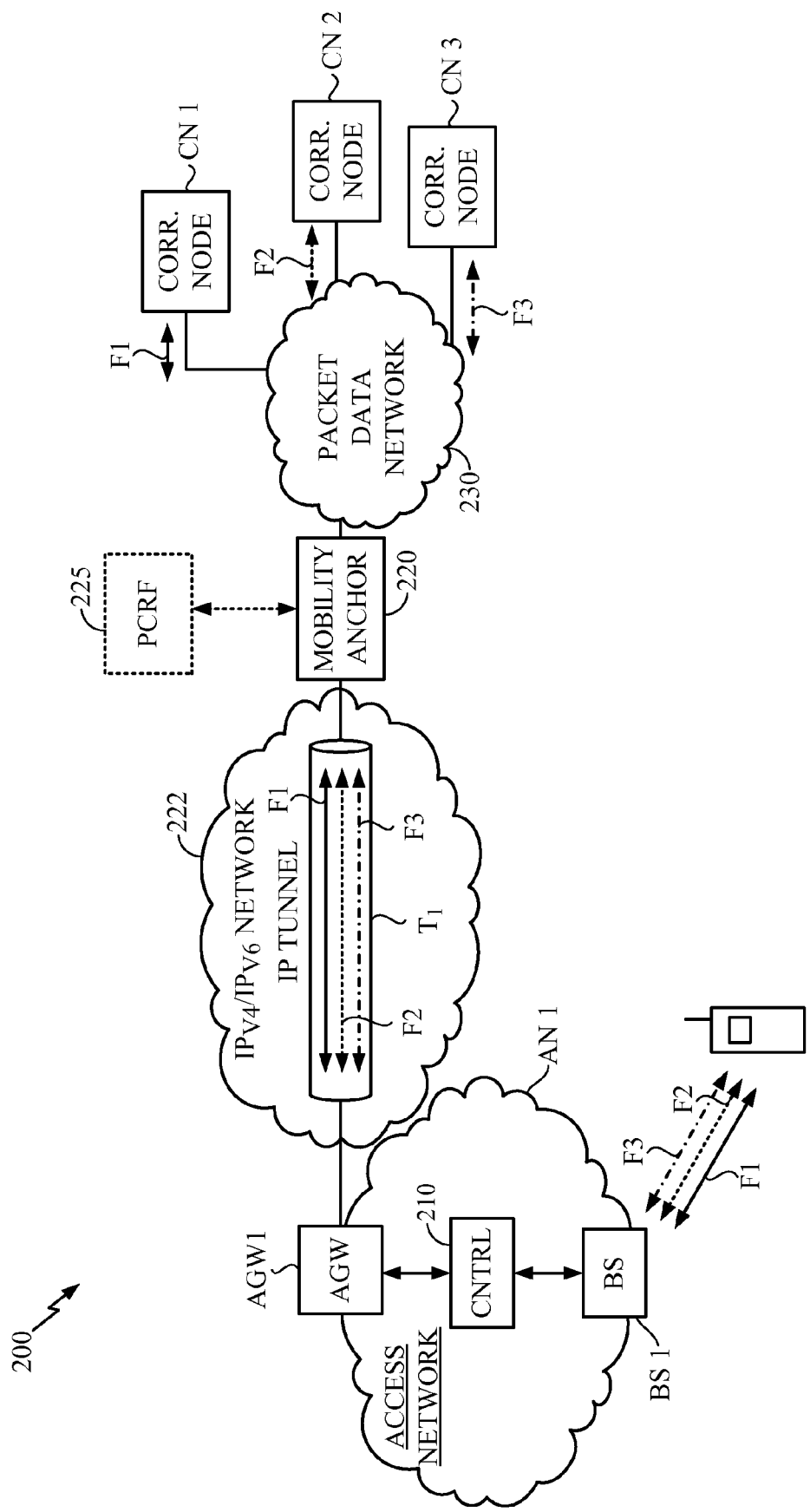
FIGS. 2A and 2B illustrate network topologies that may be used to implement the functionality described in connection with FIGS. 1A and 1B, respectively.
Figure 2B:
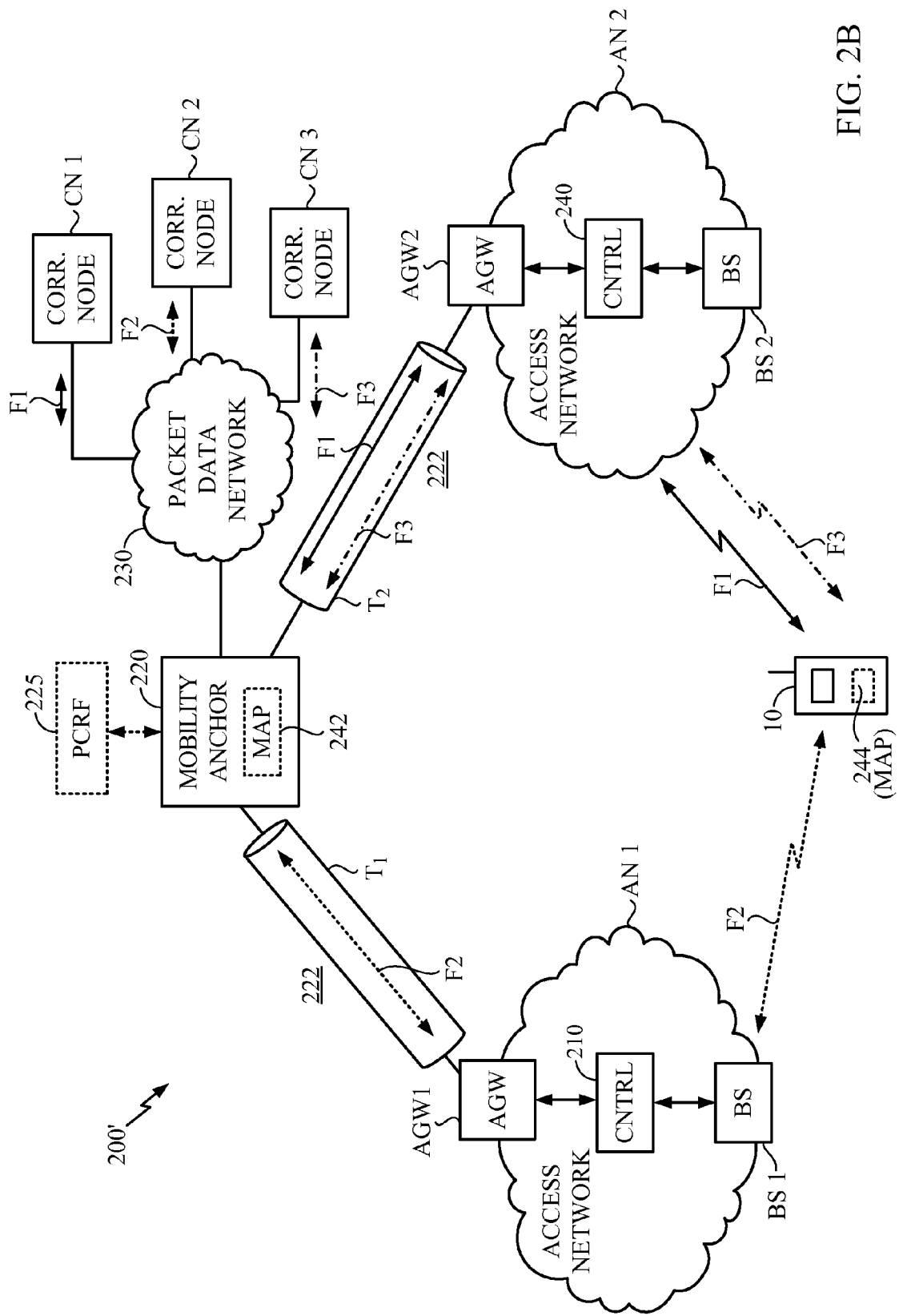

FIGS. 2A and 2B illustrate network topologies that may be used to implement the functionality described in connection with FIGS. 1A and 1B, respectively. Referring to FIG. 2A, topology 200 includes access network AN1 comprising base station BS1 which communicates flows F1-F3 with AT 10 as described above. Access network AN1 further includes an access gateway (AGW) AGW1 which routes flows F1-F3 through an IP tunnel $T_1$. A "mobility anchor" 220 connects to the opposite side of the tunnel $T_1$ and routes flows to a packet data network 230, typically the Internet. Mobility anchor 220 is part of the home network for AT 10, and is also considered a component of a core network serving access terminals such as AT 10. In a network (i.e., core plus access network) conforming to the PMIP specification, mobility anchor 220 is implemented as a local mobility anchor (LMA), and access gateway AGW1 is a mobility access gateway (MAG). In a network conforming to the CMIP specification, mobility anchor 220 is implemented as a "home agent", and access gateway AGW1 performs the functions of foreign agents or access routers according to CMIP (depending on which protocol version the access network follows). Recent versions of CMIP and PMIP specifications mentioned above, i.e., RFC 3775 and 5213, respectively, define requirements to handle mobility operations for IPv6 as well as IPv4 type addresses. These specifications are incorporated herein by reference. To the extent that functionality of the embodiments described herein might conflict with any goals or requirements of either of these specifications, embodiments herein can still be practiced within networks otherwise conforming to these specifications by overruling any such conflicting goals or requirements.

Control blocks 210, 240, e.g., radio network controllers (RNCs), generally control operations of the respective access networks AN1 and AN2. Control blocks 210, 240 consult a database, e.g., a HAAA database (not shown) of the core network, for authentication and authorization when access terminals first attempt to gain network access. The database is also consulted to obtain the home network information associated with each access terminal attempting access. In a network conforming to the LTE specification, a PCRF (Policy Control and Rules Function) 225 provides command and control signals to mobility anchor 220.

Flows F1-F3 are tunneled via IP tunnel $T_1$ between mobility anchor 220 and access gateway AGW1. An IP tunnel is an IP network communications channel between two networks, which in this case are the core network to which anchor 220 belongs, and the access network AN1 to which access gateway AGW1 belongs. As explained in the PMIP specification, for example, tunneling hides the network topology and allows the IP datagram of the mobile node (access terminal) to be encapsulated as a payload of another IP packet and to be routed between the local mobility anchor and the mobile access gateway. On most operating systems, a tunnel is implemented as a virtual point-to-point interface. The source and destination address of the two endpoints of this virtual interface along with the encapsulation mode are specified. Any packet that is routed over this interface gets encapsulated with the outer header as specified for that point-to-point tunnel interface.

Correspondent nodes CN1-CN3 are attached to packet data network 202 and are the originators/destination points of respective flows F1-F3 in the downlink/uplink directions, respectively. Any correspondent node may be, e.g., a server running a web site to which AT 10 has requested access; a server providing a broadcast, whereby most traffic between the AT 10 and the correspondent node flows in the downlink direction; a fixed location computer; another access terminal communicating with AT 10 using VoIP technology; or any other host configured to operate in a CMIP, PMIP or other suitable mobility protocol. The mobility protocol followed should be transparent to the correspondent nodes. That is, each correspondent node sending and receiving packets to/from an access terminal should perceive the access terminal as just an ordinary host attached to the Internet, with a normal destination address, destination port, etc.

Referring to FIG. 2B, network topology 200' is formed, in accordance with an aspect of the disclosure, to implement the flow mobility functionality as described in connection with FIG. 1B. In this topology, the second access network AN2, which includes a second access gateway AGW2, handles some of the data flow routed to/from AT 10. In order to move one or more of flows F1-F3 from access network AN1 to AN2, a second IP tunnel $T_2$ is set up between mobility anchor 220 and access gateway AGW2. In the example, flows F1 and F3 are handed off to access network AN2 while flow F2 remains handled by AN1.

The handoff is performed while maintaining the same IP address for AT 10. This may be done by setting up a flow map 242, such as a traffic flow template (TFT) within the mobility anchor 220 and also a similar flow map 244 within AT 10. The flow maps point the respective flows to the desired tunnels and access networks based on information normally contained within their packet headers, such as the 5-tuple of destination address, destination port, source address, source port, and protocol. To route the packets to their correct paths, mobility anchor 220 and AT 10 each perform processing using packet filtering in accordance with the mapping information. By maintaining the same IP address and port numbers, the handoff may be transparent to the correspondent nodes. Thus there is no need to tear down the mobility session and start a new one using a different IP address, as is done by conventional techniques.

Figure 3:
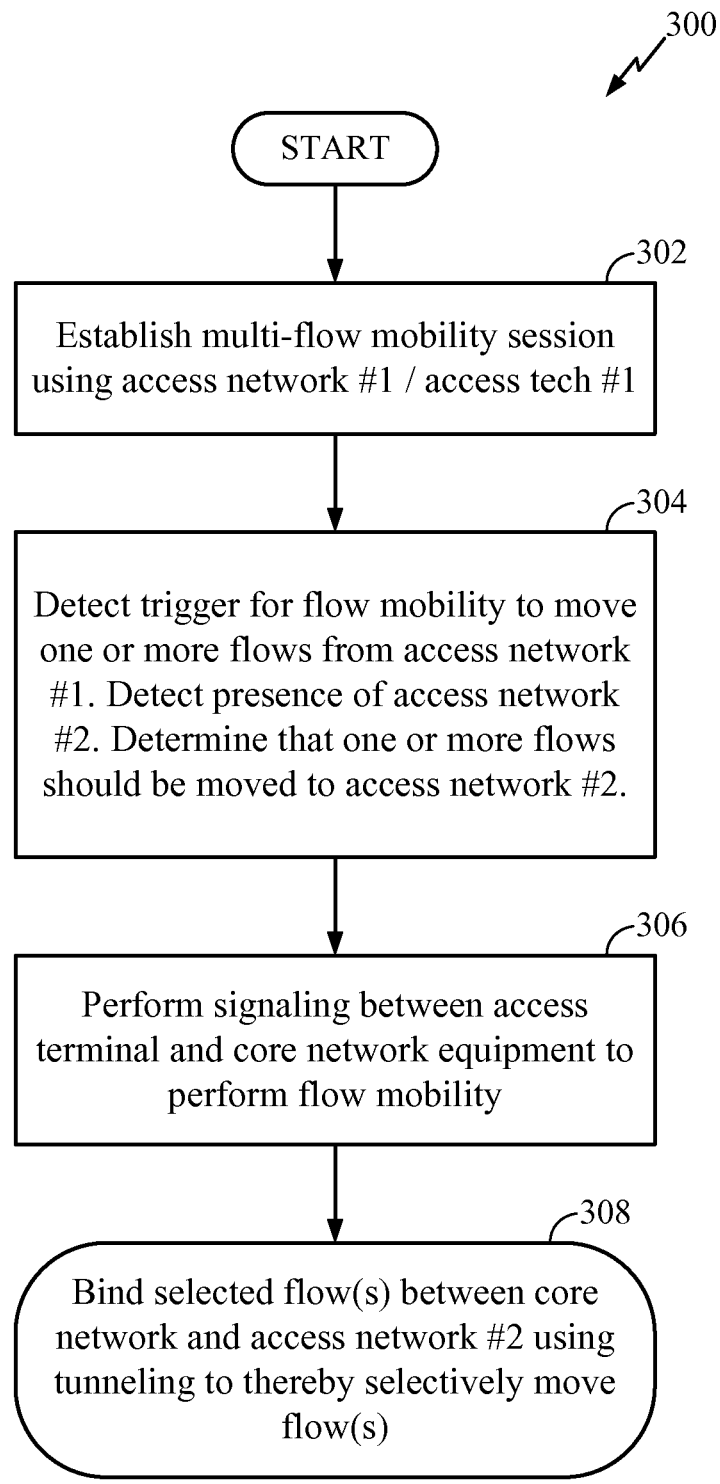
FIG. 3 illustrates a process for implementing flow mobility in accordance with an aspect of the disclosure.

FIG. 3 illustrates a process 300 for implementing flow mobility in accordance with an aspect of the disclosure. At step 302, a mobility session is established for an access terminal via a first access network using a first access technology. This mobility session handles multiple IP data flows. Next, at step 304, a trigger for flow mobility is detected to move one or more flows from access network #1. The access terminal detects the presence of a second access network operating with a second access technology. A determination is made that one or more flows (but not all flows) should be moved to the second access network, or, that a new flow to be initiated should be handled by the second access network. To this end, at step 306 signaling is performed between the access terminal and the core network associated with the first access network to initiate flow mobility. This signaling may be initiated by the AT or by the network, depending on the circumstances surrounding the desired flow mobility. Thereafter, flow maps are set up at both the mobility anchor and the access terminal to direct the respective flows along the desired paths. The flows are selectively moved between the access technologies at step 308.

Figure 4A:
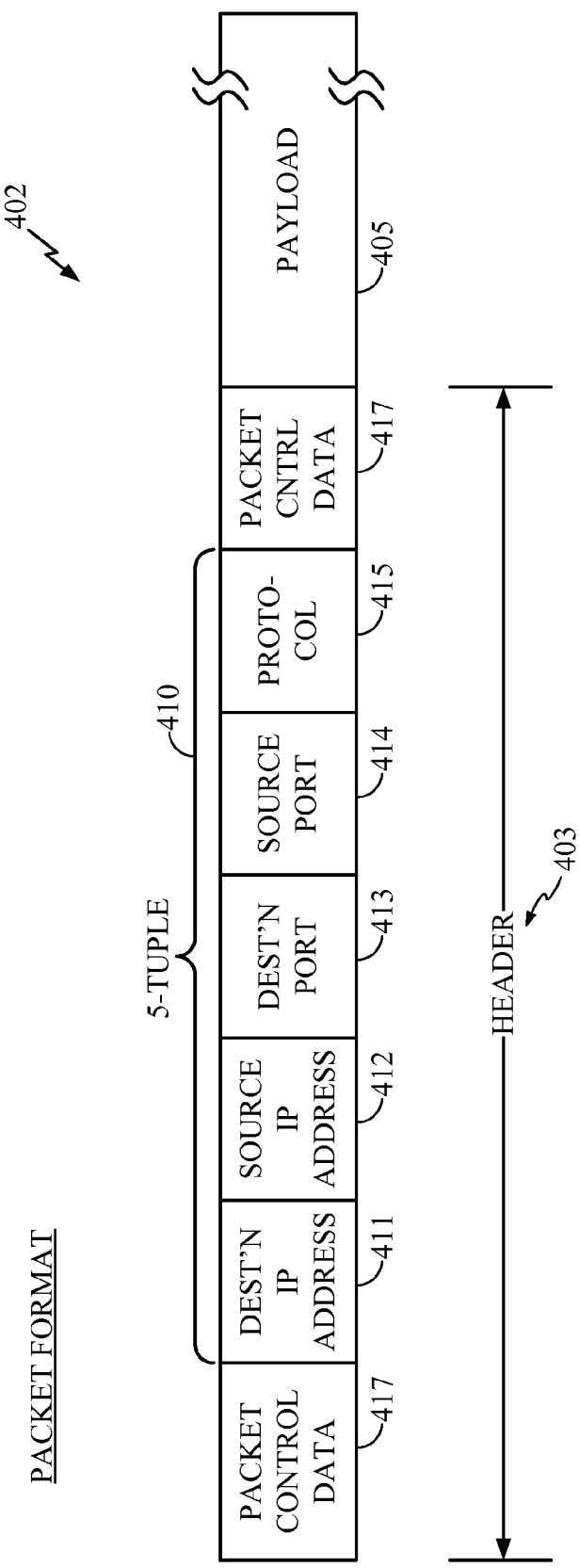
FIG. 4A illustrates an example of packet frame format for the transmission of IP packets in aspects disclosed herein.
Figure 4B:
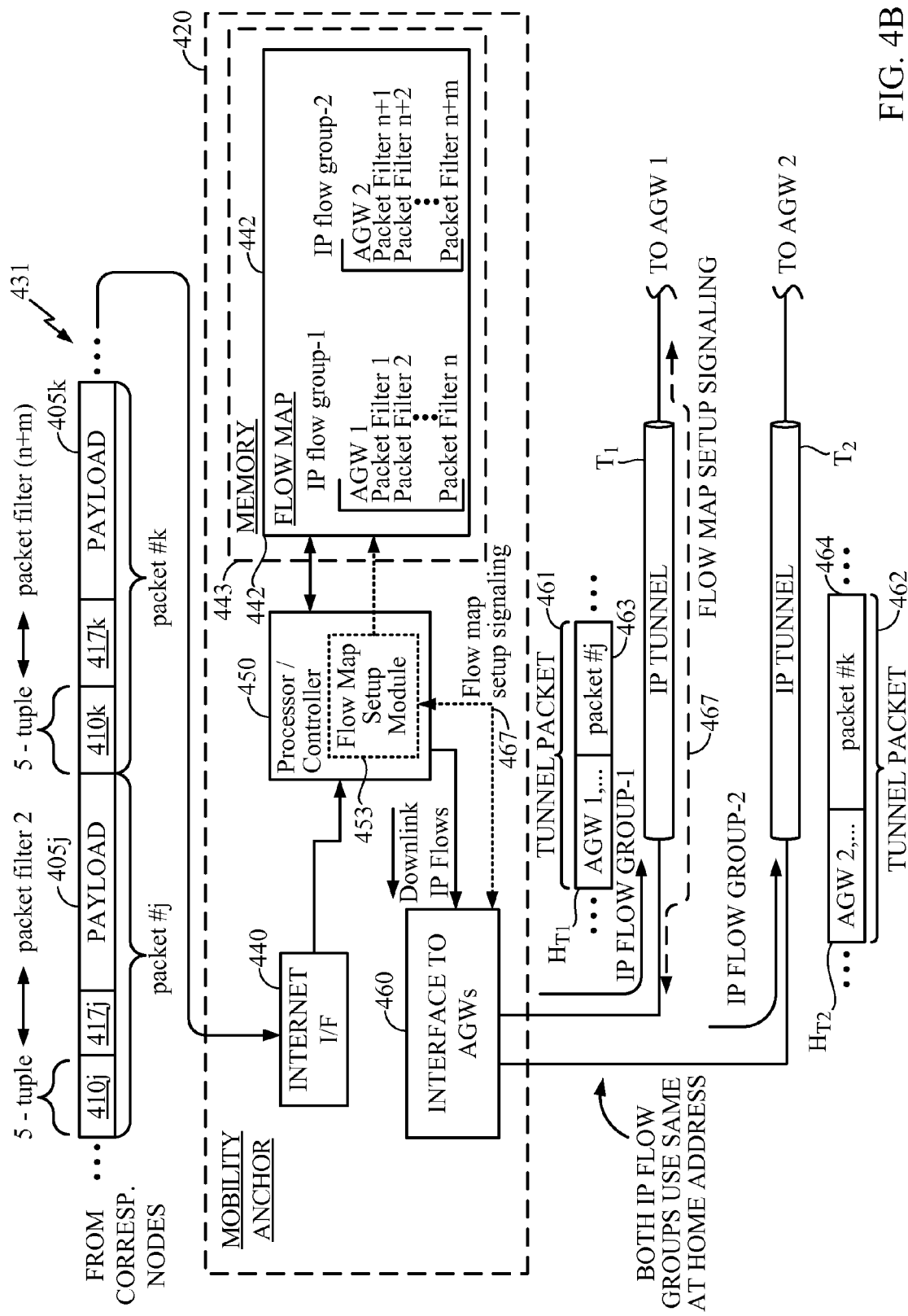
FIG. 4B is a functional block diagram of a mobility anchor which may perform the functionality of the mobility anchor shown in FIG. 2B.

FIG. 4A illustrates an example of packet frame format for the transmission of IP packets in aspects disclosed herein. FIG. 4B is a functional block diagram of a mobility anchor, 420, which may perform the functionality of anchor 220 in the network topology of FIG. 2B. Referring first to FIG. 4B, mobility anchor 420 has a volatile memory 443 within which a flow map 442 specifically assigned for AT 10 is dynamically stored. Flow map 442 may be a traffic flow template (TFT), mapping structure, look-up table, listing, or the like, that serves to identify the access gateway and thus, the access network, to which each flow (identified by the packet filter) should be directed. A processor/controller 450 generally controls the operations of mobility anchor 420, and may include a flow map setup module 453 to setup the flow map 442. Flow map 442 may be set up initially whenever a decision is made to initiate flow mobility, e.g., to move an existing data flow from one access network (and associated technology) to another. As mentioned, the decision to initiate flow mobility may be made by the AT or the network. To this end, flow map setup signaling 467 may be communicated between mobility anchor 420 and AT 10 to setup the flow map and thus the flow mobility process. Flow mobility can be achieved by performing the signaling between the AT and the core network to set up an initial flow map (or new flow map, if replacing a prior one) to the active access technologies. The signaling may be performed in a number of ways as will be described below.

In the downlink direction, flow map 442 may be consulted to selectively route packets to each access gateway (AGW) that is set up to handle flows for AT 10. In the example map 442 shown, n+m unique packet filters are stored. Packets having characteristics of packet filters 1 through n are associated with an IP flow group-1 destined for access gateway AGW1. Packets having characteristics of packet filters n+1 through n+m are to be directed to access gateway AGW2 as part of IP flow group-2.

Mobility anchor 420 is attached to the Internet via interfaces 440 and 460 (which may be implemented as a common interface but are shown separately for ease of understanding). Internet interface 440 receives incoming packets from the Internet destined for AT 10, i.e., packets having headers with the home address for AT 10 as their destination address. These packets typically originate from different correspondent nodes with which AT 10 has initiated separate data communication sessions. (However, in some cases, packets associated with different flows may originate from different source ports of the same correspondent node.) The packets are provided to processor/controller 450, which consults flow map 442 to determine how each packet is to be routed. The determination is based on a matching of the packet header information of the packet with one of the packet filters within flow map 442. Processor/controller 450 then adds a tunnel header to the packet, including an identifier (access network ID) or IP address for the AGW to which the packet is to be forwarded. That is, the packet is encapsulated with a tunnel header, thereby directing the packet to the desired IP tunnel and AGW, via the interface to the AGWs 460. In other words, a binding between the AGW and the mobility anchor 420 has been created for the flow containing the packet.

To more fully explain the packet encapsulation and routing operation by mobility anchor 420, an example is presented in which two packets, packet #j and packet #k originating from different correspondent nodes, arrive at mobility anchor 420 as part of an incident packet stream 431. These packets may each be constructed according to a packet frame format as shown in FIG. 4A.

Referring to FIG. 4A, packet frame format 402 includes a header 403 and payload 405. Header 403 includes a 5-tuple portion 410 and packet control data portions 417. 5-tuple portion contains fields for a destination IP address 411, a source IP address 412, a destination port 413, a source port 414 and a protocol 415. In this example, mobility anchor 420 maintains a single IP address for AT 10; thus each incident packet intended for AT 10 as a destination has the same value for the destination IP address 411.

The source IP address 412 identifies the IP address of the correspondent node from which the packet originates. The destination port 413 identifies the logical port of AT 10 for which the packet is intended. A different destination port may be designated for each data communication session, i.e., for each IP flow, that is handled simultaneously by AT 10. For instance, a first destination port may be designated for a VoIP session; a second destination port may be designated for a concurrent browser application session; and so forth. Similarly, the source port 414 identifies the logical source port of the correspondent node. The protocol field 415 identifies the particular protocol of the data communication session to which the packet belongs (TCP, UDP or ICMP, etc.). The packet control data fields 417 contain overhead data such as codewords identifying the type of Internet address (IPv4 or IPv6); the length of the header; the length of the packet payload; security information; etc.

With continuing reference to FIG. 4B, packet #j contains a 5-tuple header portion 410j followed by a packet control data field 417j and a payload field 405j. Likewise, packet #k contains fields 410k, 417k and 405k. For this example, it is assumed that the 5-tuple fields of header 410j (packet #j) exactly match only those listed for packet filter 2 of flow map 442. It is further assumed that the five fields of header 410k (packet #k) exactly match those listed for packet filter n+m of flow map 442. Processor/controller 450 discerns the matching conditions, thereby determining that packet #j should be routed towards AGW1 as part of IP flow group-1 and packet #k towards AGW2 as part of IP flow group-2. Processor/controller 450 then tunnels packet #j to AGW1 via IP tunnel $T_1$. In practice, this may be done by assembling a tunnel packet 461 containing a tunnel header $H_{T1}$ followed by packet #j. Header $H_{T1}$ includes an identifier for AGW1 and/or its IP address. Thus, packet #j is encapsulated within tunnel packet 461. The tunnel packet 461 may be transmitted through the Internet to arrive at AGW1 using conventional packet routing. (I.e., IP tunnel $T_1$ may be understood as a logical entity rather than a dedicated bearer.) Similarly, packet #k is encapsulated within tunnel packet 462 using header $H_{T2}$, and routed to AGW2.

It is noted here that each entry within flow map 442 for a packet filter (i.e., packet filter 1 through packet filter n+m) may contain a set of values for only a subset of the 5-tuple packet header, rather than for the entire 5-tuple. A 5-tuple subset may be used that is sufficient to differentiate the packets for proper routing to the respective AGWs. In essence, since all data flows that may be designated for IP mobility in accordance with the embodiments herein use the same IP address for the AT, the 5-tuple subset that may be used to map the data flows can be broken down to a 4-tuple subset. That is, at least the downlink data flows can be IP tunneled in accordance with a matching of packet header data thereof to flow map entries for one or more of: a destination port of the AT, a source port of the correspondent node (CN) attempting communication with the AT, a source address of the CN, and a protocol used for communication between the correspondent node and the CN.

In the reverse direction, i.e., the uplink path from the AGWs to the mobility anchor 420, processor/controller 450 need not consult map 442 to determine how to route incoming packets. Instead, processor/controller 450 removes a tunnel header from incoming tunnel packets and inspects the destination addresses in the IP packet headers encapsulated therein, originally sent by AT 10. The packets are then routed to respective correspondent nodes via interface 440 according to the destination addresses. Thus the routing is done in the manner normally performed using the mobility protocol followed by the mobility anchor 420 (e.g. PMIP or CMIP).

It is also possible, in a network following the CMIP protocol, for uplink packets from the AT to be routed to the intended correspondent node along a different route altogether, i.e., along a route that does not include the mobility anchor 420.

Figure 5:
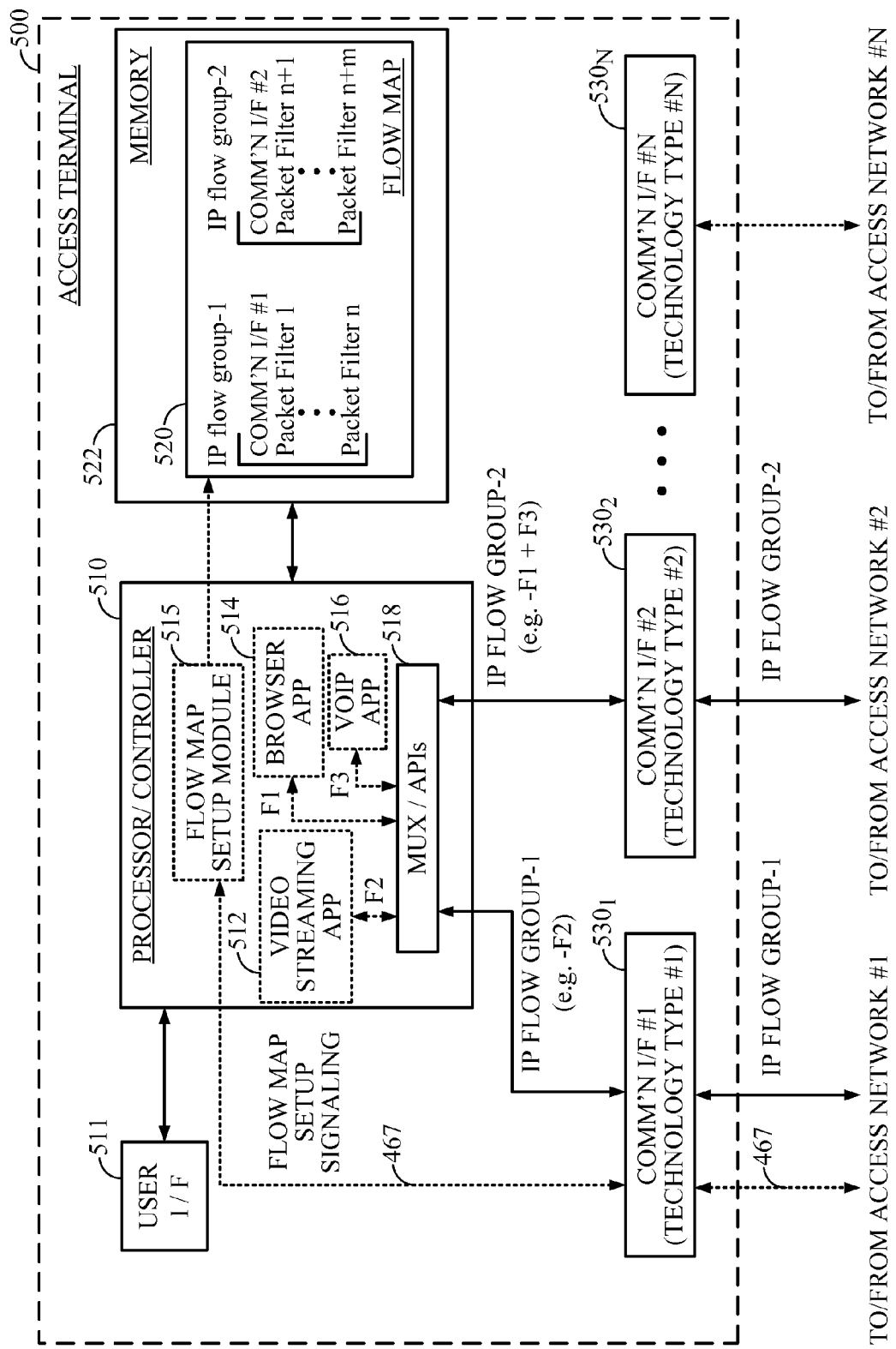
FIG. 5 is a functional block diagram of an access terminal that may be used to perform data communication with flow mobility in accordance with an aspect.

FIG. 5 is a functional block diagram of an access terminal (AT), 500, that may be used to perform data communication with flow mobility in accordance with an aspect of the disclosure. AT 500 may perform the functions described above for AT 10 in connection with FIGS. 1-4B. For simplicity, only component blocks relevant to performing flow mobility are shown and described.

AT 500 is configured with communication electronics and processing capability for handling multiple IP data communications sessions (i.e. multiple IP flows) using one or more access technologies. N communication interfaces, $530_1$ to $530_N$, are employed to transmit/receive data between AT 500 and N types of access networks, using N types of access technologies, respectively. Each communication interface $530_i$ includes RF electronics and processing sufficient to perform the necessary transmit and receive functions for the respective air interface technology. Processor/controller 510 controls generally the operations of AT 500, including the control of a user interface 511. Processor/controller 510, memory 522 as well as communication interfaces $530_1$-$530_N$ are formed as part of one or more integrated circuits.

By way of example to facilitate an understanding of the concepts taught herein, processor/controller 510 is shown comprising three application (app) modules for producing IP data flows: video streaming app module 512, browser app module 514 and VoIP app module 516. Each of these is typically a software module running on processor/controller 510. As explained above in connection with FIG. 1A, the IP data from multiple types of applications can be transmitted on one uplink channel (and received on one downlink channel) of a single access technology by means of suitable packetizing and multiplexing. Accordingly, multiplexer/API (application program interface) block 518 may perform these tasks within processor/controller 510.

To support IP flow mobility in accordance with aspects described herein, i.e., the selective transfer of IP flows between access networks of different technologies, AT 500 may set up a flow map 520 (e.g., a TFT, lookup table or mapping structure) within memory 522. Flow map 520 may be similar to the map 442 setup within the mobility anchor 420 (FIG. 4B) in the home network that establishes an IP address for AT 500. Processor/controller 510 may include a flow map setup module 515 functioning to setup map 520. When a trigger occurs to initiate a flow mobility operation, flow map setup signaling 467 may be sent back and forth between flow map setup module 515 and the flow map setup module 453 within mobility anchor 420.

As an example, suppose that in the uplink direction, each IP flow F2, F1 and F3 from the three applications 512, 514 and 516, respectively was first transmitted as part of a common flow group by way of access network #1 and technology type #1. Since each flow is originating from a device (AT 500) having the same IP address, each flow is identifiable via the assignment of a unique source port value in the source port field of its headers. Further, if each flow is destined for a different correspondent node having a different destination address, each flow can be further distinguishable via the destination address fields of its headers.

In the example it is further assumed that a flow mobility trigger occurred and a decision is made (either by processor/controller of AT 500 or by the network) to initiate movement of flows F1 and F3 over to access network #2. In this case, IP flow group-1 comprises flow F2 and IP flow group-2 comprises flows F1 and F3. Thus, in flow map 520, IP flow group-1 which has a corresponding entry for communication I/F #1 corresponding to the access technology used by access network #1, has a packet filter entry matching the source port (on the uplink) of flow F2 (for the video streaming app), the destination IP address and the destination port. Likewise, IP flow group-2 has the mapping of the access network AN2 to the associated entries for packet filters matching the (uplink) source ports, the destination IP address and the destination port for flows F1 and F3. Thus, the same flow map 442 stored in the mobility anchor 420 of FIG. 4B may be stored as map 520 in AT 500 to help direct the uplink flows to the appropriate access networks. (Of course, the uplink source ports correspond to the downlink destination ports, and vice versa; the uplink destination addresses correspond to the downlink source addresses and vice versa.) With regard to the downlink packets transmitted to AT 500, flow map 520 need not be consulted since these packets already include the downlink destination ports corresponding to the respective applications (browser, VoIP, etc.).

Figure 6:
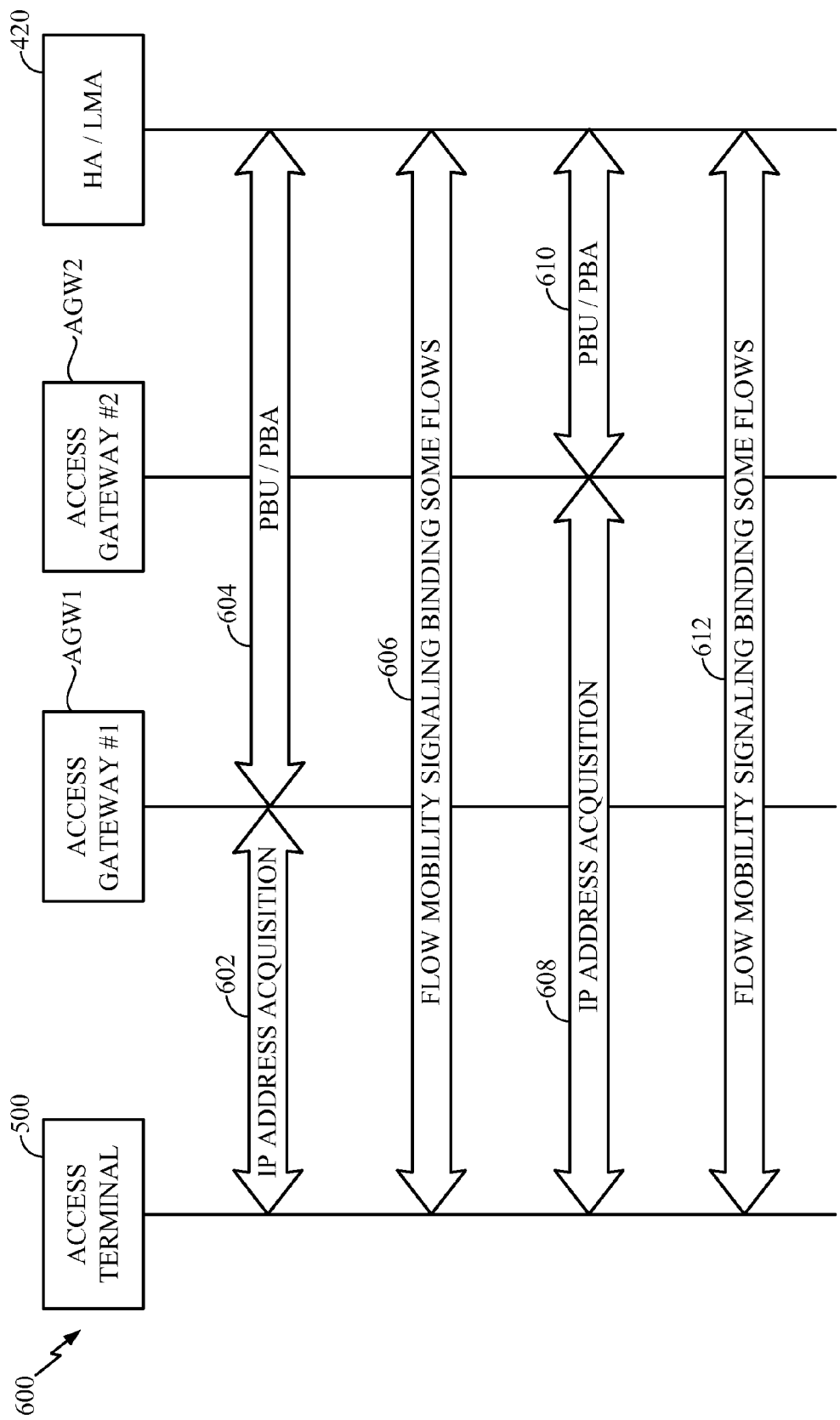
FIG. 6 is a signaling flow diagram that illustrates an exemplary process by which an access terminal and a network implement flow mobility in accordance with an aspect of the disclosure.

FIG. 6 is a signaling flow diagram that illustrates an exemplary process 600 by which an AT and a network implement flow mobility in accordance with an aspect of the disclosure. In the example, it is assumed that when AT 500 is first turned on or initiates a first IP based application, it detects the presence of access network (AN) #1 comprising access gateway AGW1 and selects AN#1 to handle the application. For example, AN#1 may be the default network, the network having the strongest signal, the network having the most available capacity, etc.

When AT 500 first attempts to connect to the Internet, it needs to acquire an IP address for itself, which is to be included in the address fields of both uplink and downlink packets. Accordingly, at step 602 an IP address acquisition process for AT 500 is performed. Depending on the protocol supported by the network to which access gateway AGW1 belongs, the address may be IPv4 or IPv6 and may be obtainable via the DHCP process. Also, the network may follow either the PMIP or CMIP mobility protocols. In the address acquisition process, AT 500 is in data communication with AGW1 via a base station (not shown) with an air interface link to AT 500. AT 500 provides the base station with an equipment ID or subscriber ID identifying itself. Access gateway AGW1 or a controller of the access network consults a database, e.g., an HAAA, to determine the home network to which AT 500 belongs based on the ID provided. This home network includes mobility anchor 420 (exemplified as home agent (HA)/LMA 420 in FIG. 6) which is responsible for assigning and maintaining an IP address for AT 500. In accordance with the procedure followed in both the CMIP and PMIP specifications, at step 604 a packet binding update/packet binding acknowledgement (PBU/PBA) procedure is implemented to establish a binding, i.e., an IP tunnel, between mobility anchor 420 and access gateway AGW1.

It is noted here that it's feasible and permissible to utilize different mobility anchors for different flows, using different home IP addresses for the access terminal. However, in this case, in accordance with the embodiments herein, after a flow is established, it sticks with the same mobility anchor and home IP address after the access network has been changed (i.e., following a flow handoff).

In general, a PMIP proxy binding update (PBU) message, for example, is a request message sent by the mobile access gateway (MAG) to the LMA associated with the AT (called mobile node or MN in the PMIPv6 spec). This request message is sent to establish a binding between the mobile node's home network prefix (MN-HNP) or prefixes assigned to a given interface of the mobile node and its current care-of address (also called Proxy CoA). The MN-HNP is a prefix assigned to the link between the mobile node and the MAG. A PBA is a reply message sent by the LMA in response to the PBU message that it received from the MAG. The mobile node configures its interface with one or more addresses from its home network prefix. That is, the mobile node's home address is an address from the mobile node's home network prefix. (It is noted here that in CMIP, the home agent is always aware of the home address of the mobile node; however, in PMIPv6, the mobility entities are always aware of the mobile node's home network prefix but are not always aware of the exact address that the mobile node configured on its interface from its home network prefix.) The Proxy CoA is defined as the global address configured on the egress interface of the MAG, and is the transport endpoint of the tunnel between the LMA and the MAG. The LMA views this address as the care-of address of the mobile node and registers it in the Binding Cache entry for that mobile node.

Accordingly, in the procedure of steps 602 and 604 by which the AT 500 obtains its IP address, the access gateway AGW1 first communicates with mobility anchor 420 using its own care-of address and identifying AT 500. In response, mobility anchor 420 consults its database and provides access gateway AGW1 with a home address or portion thereof already allocated for AT 500; a tunnel is established between access gateway AGW1 and mobility anchor 420; and the home address is forwarded to AT 500 for use in its subsequent IP communications. One or more IP flows are then propagated between AT 500 and correspondent nodes through the tunnel established between access gateway AGW1 and mobility anchor 420 as described above.

When a flow mobility trigger occurs to move one or more of the flows from access gateway AGW1 to access gateway AGW2 associated with a second access network and technology, flow mobility setup signaling is exchanged at step 606 between AT 500 and mobility anchor 420 for that flow. This signaling carries the flow map data, which maps the IP data flow to an access network as mentioned earlier, and may be carried out via any one of a number of methods as described below. With any of these methods, either the AT 500 or a network equipment component (e.g., access gateway, mobility anchor or PCRF in an LTE system) may trigger the flow mobility setup procedure. The signaling may be performed via the currently used (first) access network, or alternatively, via the new ($2^{nd}$) access network. If performed on the current access network, an "access network id" parameter can be used to bind packet flows instead of an "access gateway IP address".

In a first method, the signaling at 606 is performed as a general signaling (i.e., a new signaling) between the AT 500 and the mobility anchor to carry the flow map.

In a second method, the signaling at 606 is performed as RSVP (Resource Reservation Protocol) signaling between AT 500 and mobility anchor 420. In general, RSVP signaling is a transport layer protocol designed to reserve resources across a network. RSVP operation will generally result in resources being reserved in each node along a path. RSVP signaling is described in specification RFC 2205.

In a third method, signaling at 606 is implemented using different techniques along the route between AT 500 and mobility anchor 420. Along the path between AT 500 and access gateway AGW1, RSVP signaling can be used to transfer the flow map. Along the path between access gateway AGW1 and mobility anchor 420, proxy binding signaling between AGW1 and mobility anchor 420 can be used to transfer the flow map.

In a fourth method, IP address signaling is extended to carry the flow map at step 606. This technique involves extending an IPCP (IP control protocol), IPv6CP or VSNCP (vendor specific network control protocol) to carry the flow map between AT 500 and access gateway AGW1. Depending on the protocol used, PMIP or CMIP signaling is extended to carry the flow map between the access gateway AGW1 and mobility anchor 420.

In a fifth method, signaling at 606 is accomplished by extending vendor specific packets (VSP) of Link Control Protocol (LCP) packets to exchange the flow map between AT 500 and access gateway AGW1. Depending on the protocol used, PMIP or CMIP signaling is extended to carry the flow map between the MAG and the LMA.

In a sixth method, the flow map is carried between AT 500 and mobility anchor 420 with the use of IP-Sec (Internet Protocol Security) or Mobile-IP signaling.

Once flow mobility signaling of step 606 is complete, AT 500 and mobility anchor 420 are both in possession of the flow map, whereupon the flow(s) designated for movement to the second access network are moved there. This process involves an IP address acquisition procedure 608 in which the access gateway AGW2 associated with the second access network is provided with the IP address already established for AT 500 by the mobility anchor 420. Thereafter PBU/PBA messages are exchanged at 610 between access gateway AGW2 and mobility anchor 420 in the same or similar manner as described for step 604. At this point, one or more IP flows to/from AT 500 is routed through each of the access gateways AGW1 and AGW2. If another flow mobility trigger occurs which indicates the desirability to again move flows around among access gateways, flow mobility signaling is again performed at step 612.

It is noted here that when an IP flow is included on the flow map by virtue of a packet filter thereon uniquely matching the 5-tuple header (or subset) of packets in that flow, and the flow thereby becomes bound to an AGW, the flow may be considered "hard-bound" to that AGW. The flow is thus hard-bound for so long as the flow map with the matching packet filter continues to be stored at the mobility anchor 420.

A situation may exist wherein a flow already established between the AT 500 and a correspondent node is not included on the flow map stored at the mobility anchor 420. In this case, the flow excluded from the flow map may still be destined for the AT 500, but via a different IP address. For instance, the excluded flow may already have been established using a third access network having a third access gateway. These "non-hard-bound" flows, which are not explicitly bound to an AGW via the stored flow map, may be sent on a default-AGW based on operator or ANDSF policy. Non-hard-bound flows are free to move to any AGW based for example on a predefined policy or on another signaling indication.

Figure 7:
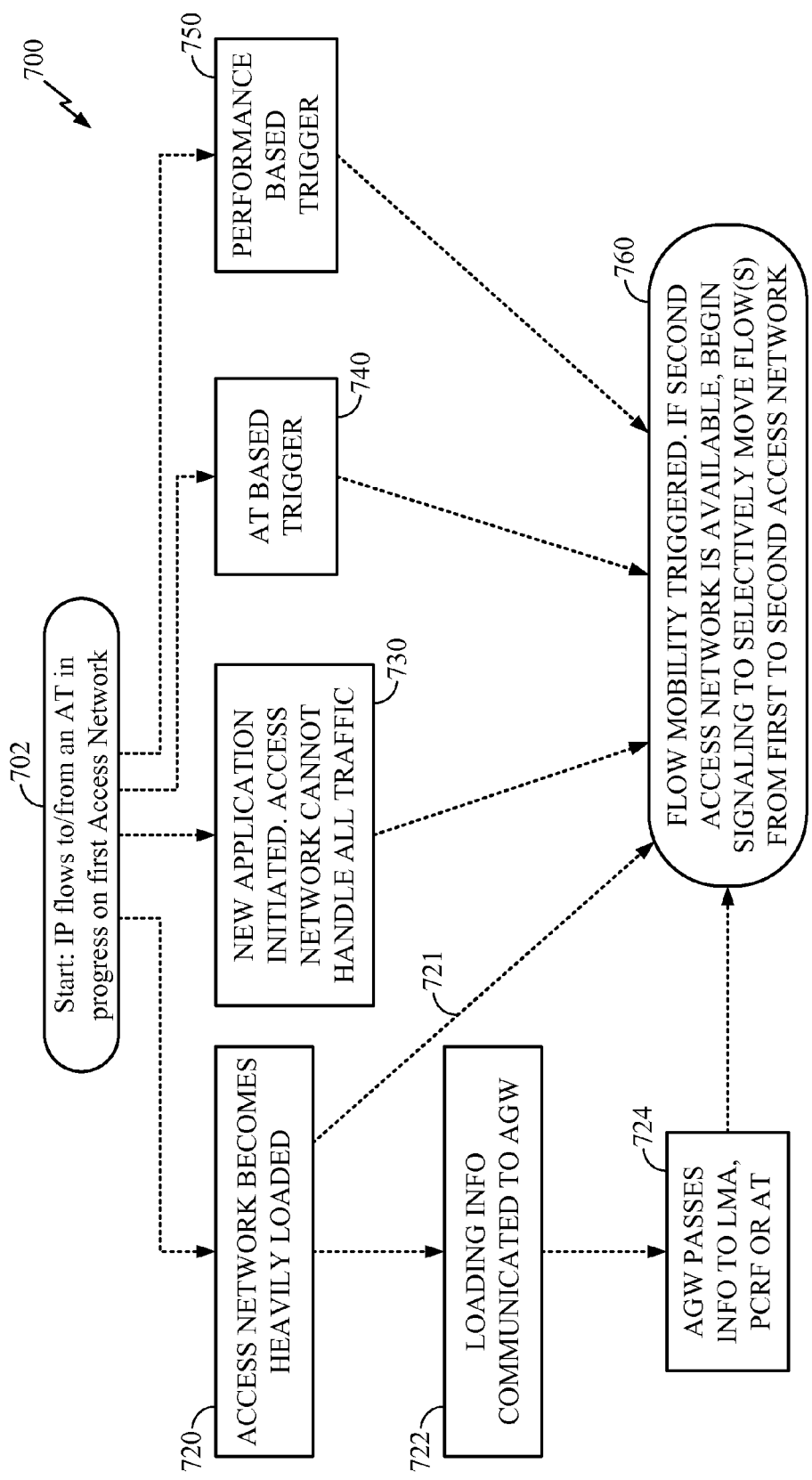
FIG. 7 illustrates a process of initiating flow mobility signaling in accordance with aspects of the disclosure.

FIG. 7 illustrates a process 700 of initiating flow mobility signaling in accordance with aspects taught herein. The process allows for flow mobility to be triggered based on any one of several detected conditions. Initially, at step 702, one or more IP flows to/from an access terminal are already in progress on a first access network employing a first access technology. Thereafter, a flow mobility trigger occurs at one or more of steps 720, 730, 740 or 750. The trigger results in the initiation of a flow mobility signaling procedure between the AT and the mobility anchor at step 760, to selectively move one or more flows to a second access network (employing a second access technology). Naturally, the availability of the second access network to the AT is confirmed prior to generating a new binding or even initiating the flow mobility signaling between the AT and the mobility anchor.

The trigger at 720 occurs due to the first access network becoming heavily loaded, either system wide or in the portion currently serving the AT. When this occurs, the access network (AN) controller may relay the loading information to the core network. As used here, the core network includes the mobility anchor (LMA in the case of PMIP) associated with the AT. In the case of an LTE network, the core network includes the PCRF 250 (see FIG. 2A, 2B). The loading information relay may be performed directly via a microwave link or the like. If the LMA receives the information directly, it may trigger the flow mobility. The PCRF 250, if receiving the information directly, signals the LMA or AT to exchange the flow mobility signaling. These direct signaling conditions are indicated by pathway 721.

Alternatively, the AN controller (e.g., controller/database blocks 210, 240 of FIG. 2B) communicates the loading information to the AGW of the first access network (step 722), which passes the information to the LMA, PCRF or AT as indicated at step 724. In the latter case, the AT initiates the flow mobility of step 760. If, instead, the PCRF receives the information, it signals the LMA or AT to exchange the flow mobility signaling of step 760. The LMA can also trigger the signaling if it receives the loading information directly from the AGW.

Flow mobility can also be triggered when a new application is initiated (step 730). For instance, the new application may have a higher QoS (Quality of Service) requirement than other applications currently running A GBR (guaranteed bit rate) or MBR (minimum bit rate) analysis may conclude that the current network is unable to handle all the traffic. Thus a decision may be made to move one or more flows to a second access network, if available to the AT and able to handle the new application flow or at least one of the ongoing flows. The decision information can be triggered by the PCRF, LMA or AGW, and then may be indicated to the AT. Flow mobility signaling and implementation follows thereafter at 760.

At step 740, an AT based flow mobility trigger occurs. Examples of this trigger condition may include: excessive delay being experienced on the access network; non-availability of a second access network already designated for flow mobility for a certain period of time; inadequate radio signal strength or noisy condition impacting a particular access technology more than other candidate technologies; access network congestion or loading conditions; or the detection by the AT of another access network that has come within range and is more desirable for a particular flow(s). For instance, a more desirable access network may be an access network operated by a service provider that charges less for a particular type of data flow, due to the different access technology, than the access network currently used. (In this case, the trigger condition can be considered a data flow cost-based trigger condition.) Any of the AT based triggers of step 740 may lead to the flow mobility signaling procedure of step 760.

At step 750, a performance condition on either the network side or the AT side may be the basis for a flow mobility trigger event. In one example, a measure of delay or jitter for the access network per application running on the AT fails to meet a threshold. Or, the number of applications running on an AT and handled by a given access network, or the number of IP flows handled by an access network, may be higher than a predetermined number. In still other examples, thresholds are exceeded for one or more of roundtrip time; obtained bit rate (actual); nominal bit rate; or load balancing. Whatever the cause, the low performance condition triggers an analysis of whether an alternative access network is available and better suited for handling one or more of the flows, in which case the signaling of step 760 is initiated.

In the aspects disclosed herein, a security association between the AT and the mobility anchor may be established for the flow mobility signaling. The security is established for message integrity protection for the signaling messages that are exchanged between the AT and the mobility anchor. In establishing security, the AT can derive a key from a "credential" known by the AT and HAAA (Home Authentication, Authorization and Accounting server) to protect the flow mobility signaling. Examples of a credential include MN-AAA or EMSK (Extended Master Session Key). The mobility anchor can obtain the derived key from the HAAA.

The security mechanism can be based on the transport mechanism that is used. Transport mechanism examples include IPSec (Internet Protocol Security) and EAP (Extensible Authentication Protocol).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another.

A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for use in a wireless data communications system in which an access terminal is configured to selectively communicate using a plurality of access technology types, the data communications system including a mobility anchor that stores a home IP address for the access terminal, the method comprising:
    establishing a plurality of IP data flows between the access terminal and the mobility anchor using a first access network that employs a first access technology type, with each data flow transmitted between the access terminal and the mobility anchor using the same IP address for the access terminal;
    detecting a flow mobility trigger condition;
    performing signaling between the access terminal and a core network associated with the first access network to set up a flow map at the mobility anchor, wherein the flow map indicates tunneling information for at least one of the IP data flows to be moved to a second access network; and
    responding to the detected flow mobility trigger condition, by moving at least one of the IP data flows, based on the flow map, to the second access network using the same IP address for the access terminal and using a second access technology type while maintaining at least another one of the data flows to the first access network using the first access technology type.

2. The method of claim 1, wherein the mobility anchor routes flows to the access terminal via IP tunneling to the first and second access networks, and wherein the moving at least one of the IP data flows further comprises:
    setting up the flow map at both the access terminal and the mobility anchor to map IP data flows with respect to the access terminal to the first or second access networks.

3. The method of claim 2, wherein at least downlink flows are IP tunneled from the mobility anchor to the first and second access networks in accordance with a matching of packet header data thereof to flow map entries for at least one of: a destination port of the access terminal, a source port of a correspondent node attempting communication with the access terminal, a source address of the correspondent node, and a protocol used for communication between the access terminal and correspondent node.

4. The method of claim 2 wherein the setting up of the flow map is initiated by the access terminal.

5. The method of claim 2 wherein the setting up of the flow map is initiated by core network equipment of the communications system.

6. The method of claim 2 wherein flow map setup signaling is exchanged between the access terminal and the mobility anchor using a first signaling method between the access terminal and an access gateway of the first access network, and a second signaling method between the access gateway and the mobility anchor.

7. The method of claim 2 wherein each flow map is a traffic flow template (TFT).

8. The method of claim 1 wherein the flow mobility trigger condition is a network loading condition.

9. The method of claim 1 wherein the flow mobility trigger condition is one or more of a new application launch, an access terminal based trigger, a data flow cost-based trigger, and a performance based trigger.

10. A mobility anchor including a memory for storing a home IP address of an access terminal, the mobility anchor comprising:
a processor configured to:
route a plurality of downlink IP data flows originating from at least one correspondent node and destined for the access terminal at the home IP address, to a first access network via a first IP tunnel, whereby the first access network transmits the plurality of data flows to the access terminal using a first access technology type;
detect a flow mobility trigger condition;
perform signaling between the access terminal and a core network associated with the first access network to set up a flow map at the mobility anchor, wherein the flow map indicates tunneling information for at least one of the IP data flows to be moved to a second access network; and
respond to the flow mobility trigger condition, by moving at least a second one of the IP data flows, based on the flow map, to the second access network via a second IP tunnel for transmission to the access terminal using the same home IP address and using a second access technology, while maintaining the routing of at least a first one of the data flows to the access terminal via the first tunnel and first access network, using the same home IP address of the access terminal.

11. The mobility anchor of claim 10, wherein the processor is further configured to route a plurality of uplink data flows to the at least one correspondent node, wherein the uplink data flows: correspond to the plurality of downlink data flows, originate from the access terminal, and are received via the first and second tunnels between the first and second access networks, respectively.

12. The mobility anchor of claim 10, wherein the processor moves at least the second one of the data flows by first performing signaling to set up the flow map in the mobility anchor memory, the flow map mapping the individual data flows to the first or second access networks, such that a plurality of downlink data flows are routed using a plurality of access networks simultaneously, based on the flow map that is configured in the mobility anchor, and a destination IP address in the downlink data flows are set to the same home IP address of the access terminal, and the flow map containing a mapping of an access network to at least a subset of a five-tuple that consists of source IP address, destination IP address, source port number, destination port number and a protocol identifier.

13. The mobility anchor of claim 12, wherein at least the downlink flows are IP tunneled from the mobility anchor to the first or second access networks in accordance with a matching of packet header thereof to flow map entries for at least one of: a destination port of the access terminal, a source port of a correspondent node attempting communication with the access terminal, a source address of the correspondent node, and a protocol used for communication between the access terminal and correspondent node.

14. A non-transitory computer program product including instructions for causing a mobility anchor, which includes a memory for storing a home IP address for an access terminal, to:
route a plurality of downlink IP data flows originating from at least one correspondent node and destined for the access terminal at the home IP address, to a first access network via a first IP tunnel, whereby the first access network transmits the plurality of data flows to the access terminal using a first access technology type;
detect a flow mobility trigger condition;
perform signaling between the access terminal and a core network associated with the first access network to set up a flow map at the mobility anchor, wherein the flow map indicates tunneling information for at least one of the IP data flows to be moved to a second access network; and
respond to the flow mobility trigger condition by moving at least a second one of the IP data flows, based on the flow map, to the second access network via a second IP tunnel for transmission to the access terminal at the same IP address using a second access technology, while maintaining the routing of at least a first one of the data flows to the access terminal via the first tunnel and first access network.

15. An access terminal comprising:
a processor configured to:
communicate, via a first access technology type, a plurality of IP data flows using a home IP address allocated to the access terminal, the data flows being communicated between the access terminal and a first access network that at least receives the data flows from a mobility anchor via a first IP tunnel;
detect a flow mobility trigger condition;
perform signaling between the access terminal and a core network associated with the first access network to set up a flow map at the mobility anchor, wherein the flow map indicates tunneling information for at least one of the IP data flows to be moved to a second access network; and
respond to the flow mobility trigger condition such that at least a second one of the IP data flows is moved by the mobility anchor to the second access network through a second IP tunnel, and transmitted by the second access network using a second access technology;
wherein the processor maintains data communication of at least a first one of the data flows via the first access network using the first access technology type.

16. The access terminal of claim 15, wherein the processor is further configured to perform signaling to setup the flow map in memory thereof, the flow map mapping the individual data flows to the first or second access technologies.

17. The access terminal of claim 16, wherein the flow map entries to associate the access technologies to at least one of: a source or destination port of the access terminal, a source or destination port of a correspondent node attempting communication with the access terminal, an IP address of the correspondent node, and a protocol used for communication between the access terminal and correspondent node.

18. The access terminal of claim 16, wherein the flow map is initiated by the access terminal.

19. The access terminal of claim 15 wherein the flow mobility trigger condition is a network loading condition.

20. The access terminal of claim 15 wherein the flow mobility condition is one or more of a new application launch, an access terminal based trigger, a data flow cost-based trigger and a performance based trigger.

21. A processor for use in an access terminal, the processor configured to:
   communicate, via a first access technology type, a plurality of IP data flows using a home IP address allocated to the access terminal, the data flows being communicated between the access terminal and a first access network that at least receives the data flows from a mobility anchor via a first IP tunnel; and
   detect a flow mobility trigger condition;
   perform signaling between the access terminal and a core network associated with the first access network to set up a flow map at the mobility anchor, wherein the flow map indicates tunneling information for at least one of the IP data flows to be moved to a second access network; and
   respond to the flow mobility trigger condition such that at least a second one of the IP data flows is moved by the mobility anchor to the second access network through a second IP tunnel, and transmitted by the second access network using a second access technology;
   wherein the processor maintains data communication of at least a first one of the data flows via the first access network using the first access technology type.

22. A non-transitory computer program product including instructions for causing an access terminal to:
   communicate, via a first access technology type, a plurality of IP data flows using a home IP address allocated to the access terminal, the data flows being communicated between the access terminal and a first access network that at least receives the data flows from a mobility anchor via a first IP tunnel; and
   detect a flow mobility trigger condition;
   perform signaling between the access terminal and a core network associated with the first access network to set up a flow map at the mobility anchor, wherein the flow map indicates tunneling information for at least one of the IP data flows to be moved to the second access network; and
   respond to the flow mobility trigger condition such that at least a second one of the IP data flows is moved by the mobility anchor to the second access network through a second IP tunnel, and transmitted by the second access network using a second access technology;
   wherein the processor maintains data communication of at least a first one of the data flows via the first access network using the first access technology type.

23. A method for use in a wireless data communications system in which an access terminal is configured to selectively communicate using a plurality of access technology types, the data communications system including a mobility anchor that stores a home IP address for the access terminal, the method comprising:
   establishing a plurality of IP data flows between the access terminal and the mobility anchor using a first access network that employs a first access technology type, with each data flow transmitted between the access terminal and the mobility anchor using the same IP address for the access terminal;
   detecting a flow mobility trigger condition; and
   responsive to the trigger condition, moving at least one of the IP data flows to a second access network using the same IP address for the access terminal and using a second access technology type while maintaining at least another one of the data flows to the first access network using the first access technology type;
   wherein the processor moves at least the second one of the data flows by first performing signaling to set up a flow map in the mobility anchor memory, the flow map mapping the individual data flows to the first or second access networks, such that a plurality of downlink data flows are routed using a plurality of access networks simultaneously, based on the flow map that is configured in the mobility anchor, and a destination IP address in the downlink data flows are set to the same home IP address of the access terminal, and the flow map containing a mapping of an access network to at least a subset of a five-tuple that consists of source IP address, destination IP address, source port number, destination port number and a protocol identifier.

24. A mobility anchor including a memory for storing a home IP address of an access terminal, the mobility anchor comprising:
   a processor configured to:
      route a plurality of downlink IP data flows originating from at least one correspondent node and destined for the access terminal at the home IP address, to a first access network via a first IP tunnel, whereby the first access network transmits the plurality of data flows to the access terminal using a first access technology type; and
      responsive to a flow mobility trigger condition, move at least a second one of the IP data flows to a second access network via a second IP tunnel for transmission to the access terminal using the same home IP address and using a second access technology, while maintaining the routing of at least a first one of the data flows to the access terminal via the first tunnel and first access network, using the same home IP address of the access terminal;
   wherein the processor moves at least the second one of the data flows by first performing signaling to set up a flow map in the mobility anchor memory, the flow map mapping the individual data flows to the first or second access networks, such that a plurality of downlink data flows are routed using a plurality of access networks simultaneously, based on the flow map that is configured in the mobility anchor, and a destination IP address in the downlink data flows are set to the same home IP address of the access terminal, and the flow map containing a mapping of an access network to at least a subset of a five-tuple that consists of source IP address, destination IP address, source port number, destination port number and a protocol identifier.

25. A non-transitory computer program product including instructions for causing a mobility anchor, which includes a memory for storing a home IP address for an access terminal, to:
   route a plurality of downlink IP data flows originating from at least one correspondent node and destined for the access terminal at the home IP address, to a first access network via a first IP tunnel, whereby the first access network transmits the plurality of data flows to the access terminal using a first access technology type; and
   responsive to a flow mobility trigger condition, move at least a second one of the IP data flows to a second access network via a second IP tunnel for transmission to the access terminal at the same IP address using a second access technology, while maintaining the routing of at least a first one of the data flows to the access terminal via the first tunnel and first access network;
   wherein the processor moves at least the second one of the data flows by first performing signaling to set up a flow map in the mobility anchor memory, the flow map mapping the individual data flows to the first or second access networks, such that a plurality of downlink data flows are routed using a plurality of access networks simultaneously, based on the flow map that is configured in the mobility anchor, and a destination IP address in the downlink data flows are set to the same home IP address of the access terminal, and the flow map containing a mapping of an access network to at least a subset of a five-tuple that consists of source IP address, destination IP address, source port number, destination port number and a protocol identifier.

26. An access terminal comprising:
a processor configured to:
  communicate, via a first access technology type, a plurality of IP data flows using a home IP address allocated to the access terminal, the data flows being communicated between the access terminal and a first access network that at least receives the data flows from a mobility anchor via a first IP tunnel; and
  responsive to a flow mobility trigger condition, communicate at least a second one of the IP data flows that is: i) moved by the mobility anchor to a second access network through a second IP tunnel; and ii) transmitted by the second access network using a second access technology;
wherein the processor maintains data communication of at least a first one of the data flows via the first access network using the first access technology type; and
wherein the processor moves at least the second one of the data flows by first performing signaling to set up a flow map in the mobility anchor memory, the flow map mapping the individual data flows to the first or second access networks, such that a plurality of downlink data flows are routed using a plurality of access networks simultaneously, based on the flow map that is configured in the mobility anchor, and a destination IP address in the downlink data flows are set to the same home IP address of the access terminal, and the flow map containing a mapping of an access network to at least a subset of a five-tuple that consists of source IP address, destination IP address, source port number, destination port number and a protocol identifier.

27. A processor for use in an access terminal, the processor configured to:
  communicate, via a first access technology type, a plurality of IP data flows using a home IP address allocated to the access terminal, the data flows being communicated between the access terminal and a first access network that at least receives the data flows from a mobility anchor via a first IP tunnel; and
  responsive to a flow mobility trigger condition, communicate at least a second one of the IP data flows that is: i) moved by the mobility anchor to a second access network through a second IP tunnel; and ii) transmitted by the second access network using a second access technology;
wherein the processor maintains data communication of at least a first one of the data flows via the first access network using the first access technology type; and
wherein the processor moves at least the second one of the data flows by first performing signaling to set up a flow map in the mobility anchor memory, the flow map mapping the individual data flows to the first or second access networks, such that a plurality of downlink data flows are routed using a plurality of access networks simultaneously, based on the flow map that is configured in the mobility anchor, and a destination IP address in the downlink data flows are set to the same home IP address of the access terminal, and the flow map containing a mapping of an access network to at least a subset of a five-tuple that consists of source IP address, destination IP address, source port number, destination port number and a protocol identifier.

28. A non-transitory computer program product including instructions for causing an access terminal to:
  communicate, via a first access technology type, a plurality of IP data flows using a home IP address allocated to the access terminal, the data flows being communicated between the access terminal and a first access network that at least receives the data flows from a mobility anchor via a first IP tunnel; and
  responsive to a flow mobility trigger condition, communicate at least a second one of the IP data flows that is: i) moved by the mobility anchor to a second access network through a second IP tunnel; and ii) transmitted by the second access network using a second access technology;
wherein the processor maintains data communication of at least a first one of the data flows via the first access network using the first access technology type; and
wherein the processor moves at least the second one of the data flows by first performing signaling to set up a flow map in the mobility anchor memory, the flow map mapping the individual data flows to the first or second access networks, such that a plurality of downlink data flows are routed using a plurality of access networks simultaneously, based on the flow map that is configured in the mobility anchor, and a destination IP address in the downlink data flows are set to the same home IP address of the access terminal, and the flow map containing a mapping of an access network to at least a subset of a five-tuple that consists of source IP address, destination IP address, source port number, destination port number and a protocol identifier.

* * * * *